United States Patent

Rocchi

[15] 3,673,093

[45] June 27, 1972

[54] LIQUID DIELECTRIC COMPOSITION OF ALKYL BENZENE AND AN ANTIOXIDATION STABILIZER

[72] Inventor: Aldo Rocchi, Mantova, Italy
[73] Assignee: Montecatini Edison S.p.A., Milan, Italy
[22] Filed: May 29, 1967
[21] Appl. No.: 642,233

[30] Foreign Application Priority Data

June 3, 1967 Italy..........................................18650

[52] U.S. Cl.................................252/63.7, 174/58, 252/63, 260/666.5, 260/671, 317/259
[51] Int. Cl..........................................................H01b 3/22
[58] Field of Search................252/63.7, 63; 260/666.5, 671; 317/259; 174/58

[56] References Cited

UNITED STATES PATENTS 2,257,870  10/1941  Trautman..............................252/63.7
2,633,415  3/1953   Chenicek........................260/666.5 X
2,757,141  7/1956   Ross et al........................260/666.5 X
2,813,830  11/1957  Trautman.............................252/63.7

Primary Examiner—Robert F. Burnett
Assistant Examiner—M. E. McCamish
Attorney—Karl F. Ross

[57] ABSTRACT

A liquid composition having high dielectric strength and oxidation resistance for use as a transformer oil and for other purposes in which an electrically insulating liquid is required, the composition consisting essentially of an alkylaryl hydrocarbon (i.e., dodecylbenzene) and 10 to 1,000 parts per million (ppm) of an antioxidizer from the group of phenolic and naphtholic compounds and their nuclear-substitution products, especially alkyl-substituted cresols, phenols and aminophenols, preferably di-tertiarybutyl-paracresol and 2,4-dimethyl-6-tertiarybutylphenol. The basic hydrocarbon is preferably the alkylbenzene obtained by alkylation of benzene with alkyl groups derived from polymerization of propylene (i.e., propylene tetramer).

4 Claims, No Drawings

LIQUID DIELECTRIC COMPOSITION OF ALKYL BENZENE AND AN ANTIOXIDATION STABILIZER

FIELD OF THE INVENTION

My present invention relates to a method of preventing dielectric breakdown in high-voltage electrical devices (e.g., transformers) and to a composition adapted to be used as an electrically insulating liquid, especially transformer oil, having a high resistance to oxidation even in the presence of copper and like oxidation-promoting catalysts and a minimum dielectric strength of the order of about 40 to 60 kilovolts (KV).

BACKGROUND OF THE INVENTION

It is common practice in the electrical industry to employ liquid organic substances as electrically insulating barriers to breakdown at high voltages or as so-called "dielectrics," such liquids being used as transformer oils and also as insulating media in switching devices, capacitors and the like. For the most part, mineral oils having a dielectric strength, by conventional tests, of 40 to 60 KV are employed for these purposes and may be combined with antioxidation stabilizers adapted to reduce the sludge formation and oxidative deterioration of the transformer oil upon aging. These characteristics of the oil are conventionally tested in accordance with so-called "standards" or "specifications" established by appropriate organizations in various countries. For example, the specifications commonly in use in Italy are known as the C.E.I. Rules and have been promulgated by the Italian Electronics Committee, whereas in Germany the specifications are established under German Industrial Standard (D.I.N.) 51554 (published September 1959 as D.I.N. 51554 Bestimmung der Alterungsneigung nach Bader, pages 73–74).

In the United States, such standards are set by the American Society of Testing Materials (A.S.T.M.) and various other organizations, usually in terms of A.S.T.M. Standards. In general, the quality of a transformer oil or other liquid instrument for electrical devices, which may be used in contact with copper conductors or terminals, is given in terms of the neutralization index or neutralization number, a value expressed in mg of potassium hydroxide per gram of composition (mg KOH/g) which, for most mineral transformer oils, varies between about 0.6 and 0.8 mg KOH/g after 28 days of tests. Furthermore, the mineral oils and any substituted insulating liquids should possess a minimum dielectric strength ranging from 40 to 60 KV, a requirement which renders only certain of the mineral oils suitable for the purposes described. It should be noted that the rigorous requirements for transformer oils and the like include stability of the electrically insulating liquid over long periods of use in the presence of highly oxidative media, namely atmospheric oxygen and catalyzing metals such as copper.

OBJECTS OF THE INVENTION

It is, therefore, the principal object of the present invention to provide an improved stable composition with high dielectric strength for use as a liquid electrical insulation and as transformer oil, which composition is resistant to oxidative degradation, change in dielectric strength and to sludge formation.

A further object of this invention is to provide an improved process of operating electrical devices, especially those using insulating liquids and having copper or other metals in contact therewith.

Yet another object of the instant invention is to provide an improved electrical device in which dielectric breakdown is impeded.

DESCRIPTION OF THE INVENTION

These objects and others which will become apparent hereinafter are attained, in accordance with the present invention, by providing, in an electrical transformer, switch, capacitor or other electrical device subject to high-voltage breakdown and having copper or other metallic parts in contact with a transformer oil or liquid insulant, wherein the insulating composition is constituted by an alkylaryl hydrocarbon, preferably dodecyl benzene, the most desirable member of the class of alkyl-substituted benzenes having alkyl chains derived from the polymerization of propylene and containing from nine to 15 carbon atoms, together with a stabilizing compound selected from the group of phenolic and naphtholic compounds and their nuclear-substitution products (i.e., having substituants in the ring), especially alkyl-substituted (e.g., tertiary-butyl cresols, phenols and aminophenols. The stabilizer, which may be present in amounts of 10 to 1,000 parts per million (ppm), has been found to impart antioxidation characteristics such that the resulting composition has all of the physical and chemical characteristics and properties required for transformer oils as well as significantly greater stability. Thus the improved composition, when subjected to stability tests by conventional accelerated-oxidation methods and measurements of the neutralization number, has a neutralization value considerably lower than those of the mineral oils hitherto used in transformers after similar tests.

According to a further feature of this invention, the stabilizer is present in an amount of the order of 50 parts per million of the composition as constituted by ditertiarybutylparacresol or 2,4-dimethyl-6-tertiarybutylphenol while the base liquid is dodecylbenzene prepared from propylene tetramer. It has, surprisingly, been found that a composition of this character, when subjected to tests in accordance with the German Industrial Standard DIN 51554, remains colorless or of invariable coloration even after 28 days of tests and, even in the presence of copper, has a neutralization number or index less than 0.1 mg KOH/g.

Consequently, it is another object of this invention to provide a method of operating electrical equipment such as transformers, electric switches and the like subject to high-voltage breakdown and utilizing a liquid insulant, wherein the liquid is the dodecylbenzene/stabilizer composition described above. In use, the transformer is found to require less care and to be substantially more resistant to breakdown even after long periods of operation.

In accordance with the present invention, the oxidation and neutralization-number tests are understood to be those conventional in the art and may be carried out in accordance with the CEI Rules referred to earlier or the German Industrial Standard DIN 51554. In the United States, an equivalent oxidation test is described in ASTM Standard D 1904–61–T entitled "OXIDATION CHARACTERISTICS OF MINERAL TRANSFORMER OIL," the neutralization number being thereafter determined in accordance with the ASTM Standard D974–64 or, potentiometrically, in accordance with ASTM Standard D664–58.

In all cases, the stabilized composition, in accordance with the present invention, should have a minimum dielectric strength of 40 to 60 KV even after prolonged periods of test in the presence of an oxidation catalyst. The dodecylbenzene/ditertiarybutylparacresol and the dodecylbenzene/2,4-dimethyl-6-tertiarybutylphenol systems described above have been found to be surprisingly good for the present purposes.

EXAMPLE

In the following Example, the stability of the liquid-insulating composition of the present invention, consisting of dodecylbenzene containing various amounts of ditertiarybutylparacresol in parts per million has been given by comparison with a mineral transformer oil of the type heretofore used. The dodecylbenzene is represented as DDB.

The oxidation-stability test was carried out in accordance with the methods set forth in German Industrial Standard DIN 51554 for the control of transformer oil (and the ASTM Standard D1904–61T which prescribes a test of essentially equivalent character). The test consists in placing the liquid composition under examination in a standardized apparatus thermostatic to a temperature of 95°C. The liquid is aerated and retained in the dark while a copper spiral is periodically immersed therein. After periods of time of 3 days, 7 days, 14 days and 28 days, respectively, samples of the liquid are withdrawn and the neutralization number determined as set forth in the German Industrial Standard DIN 51554 or the equivalent method of ASTM Standard D97–64. In the Table, the neutralization values are given for compositions containing 10, 20, 50, 200 and 1000 parts per million of the ditertiarybutylparacresol in dodecylbenzene by comparison with a mineral transformer oil.

|  | Neutralization number variation with time | | | | |
| --- | --- | --- | --- | --- | --- |
| Dodecyl benzene plus di-tertiarybutyl-paracresol stabilizer | Starting, mg.KOH/g. | After 3 days, mg. KOH/g. | After 7 days, mg. KOH/g. | After 14 days, mg. KOH/g. | After 28 days, mg. KOH/g. |
| DDB plus 10 p.p.m. stabilizer | <0.1 | 0.1 | 0.1 | 0.6 | 1.8 |
| DDB plus 20 p.p.m. stabilizer | <0.1 | 0.1 | 0.1 | 0.1 | 0.1 |
| DDB plus 50 p.p.m. stabilizer | <0.1 | 0.1 | 0.1 | 0.1 | 0.1 |
| DDB plus 200 p.p.m. stabilizer | <0.1 | 0.1 | 0.1 | 0.1 | 0.1 |
| DDB plus 1,000 p.p.m. stabilizer | <0.1 | 0.1 | 0.1 | 0.1 | 0.1 |
| Mineral transformer oil | 0.1 | 0.2 | 0.6 | 0.7 | 0.8 |

At the end of this test, the dodecylbenzene coloration remained unchanged although, at higher concentrations of the stabilizer, a deepening of copper coloration was observed. Best results were obtained in all respects with a proportion of 50 parts per million of ditertiarybutyl-paracresol. During the test, dielectric strength, as determined by standard measurements, was found to be no less than 60 KV, i.e., a value above that of the conventional mineral oils. Even nonstabilized dodecylbenzene was found to be suitable for many purposes in connection with electrical insulation although it suffered somewhat from oxidation.

When 2,4-dimethyl-6-tertiarybutylphenol was substituted for the stabilizer of the tube, precisely the same results were obtained with equal concentration. The substitution of a mixture of equal parts of tertiarybutylphenol and tertiarybutyl-paraphenylenediamine also gave similar results when used in combination with dodecyl benzene in the indicated stabilizing quantities.

I claim:

1. An electrically insulating composition consisting essentially of an alkylbenzene and an effective quantity of an antioxidation stabilizer selected from the group which consists of ditertiarybutylparacresol, 2,4-dimethyl-6-tertiarybutylphenol and amino-phenols.

2. The composition defined in claim 1 wherein said alkylbenzene has an alkyl group formed by polymerization of propylene, said composition having a minimum dielectric strength of about 40 KV and a neutralization number no greater than 0.1 mg KOH/g after 28 days of tests in accordance with German Industrial Standard DIN 51554 or ASTM Standards D 1904–61T and D 974–64.

3. The composition defined in claim 2 wherein said alkylbenzene is dodecylbenzene and said stabilizer is present in an amount ranging from 10 to 1,000 parts per million.

4. The composition defined in claim 3 wherein said stabilizer is present in an amount of about 50 parts per million.

* * * * *